United States Patent
Pascucci et al.

(10) Patent No.: US 11,908,250 B2
(45) Date of Patent: Feb. 20, 2024

(54) TIRE DAMAGE DETECTION SYSTEM AND METHOD

(71) Applicant: BRIDGESTONE EUROPE NV/SA [BE], Zaventem (BE)

(72) Inventors: Marco Pascucci, Rome (IT); Lorenzo Alleva, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 657 days.

(21) Appl. No.: 17/059,528

(22) PCT Filed: May 27, 2019

(86) PCT No.: PCT/IB2019/054376
§ 371 (c)(1),
(2) Date: Nov. 30, 2020

(87) PCT Pub. No.: WO2019/229628
PCT Pub. Date: Dec. 5, 2019

(65) Prior Publication Data
US 2021/0260934 A1  Aug. 26, 2021

(30) Foreign Application Priority Data

May 31, 2018  (IT) .......................... 102018000005904

(51) Int. Cl.
*G07C 5/00* (2006.01)
*G07C 5/08* (2006.01)
(Continued)

(52) U.S. Cl.
CPC ............ *G07C 5/008* (2013.01); *B60C 11/246* (2013.01); *B60C 19/00* (2013.01); *B60C 23/04* (2013.01);
(Continued)

(58) Field of Classification Search
CPC ................................................ B60C 23/0488
See application file for complete search history.

(56) References Cited

U.S. PATENT DOCUMENTS

2005/0085987 A1   4/2005  Yokota et al.
2010/0238007 A1   9/2010  Kikuchi et al.
(Continued)

FOREIGN PATENT DOCUMENTS

DE   102016014960 A1   6/2017
EP      1457388 A1      9/2004
(Continued)

OTHER PUBLICATIONS

International Searching Authority: Search report for corresponding PCT/IB2019/054376 dated Sep. 4, 2019, 3 pages.

*Primary Examiner* — Todd Melton
(74) *Attorney, Agent, or Firm* — Patterson Intellectual Property Law, P.C.

(57) ABSTRACT

A tire damage detection method includes a tire damage detection stage comprising: outputting quantities indicative of speeds of a vehicle and a corresponding wheel from an acquisition device to a processing device; computing, based on the received quantities, a normalized wheel speed indicative of a ratio of the wheel speed to the vehicle speed; and detecting a potential damage to a tire based on a predefined tire damage model and on the normalized wheel speed. A preliminary stage comprises: performing tests involving test tire impacts against/on different obstacles at different vehicle speeds; measuring/acquiring test-related wheel and vehicle speeds during the performed tests; computing test-related normalized wheel speeds based on the test-related wheel and vehicle speeds; and determining the predefined tire damage model to be used in the tire damage detection stage based on the test-related normalized wheel speeds and the test-related vehicle speeds that correspond to the test tire impacts.

15 Claims, 4 Drawing Sheets

(51) Int. Cl.
  *B60C 11/24* (2006.01)
  *B60C 19/00* (2006.01)
  *B60C 23/04* (2006.01)
  *B60C 23/06* (2006.01)
  *G01M 17/02* (2006.01)
  *H04L 67/10* (2022.01)
  *G01L 5/00* (2006.01)
  *G01N 3/34* (2006.01)
  *B60R 16/023* (2006.01)

(52) U.S. Cl.
  CPC ........ *B60C 23/0488* (2013.01); *B60C 23/061* (2013.01); *B60R 16/0234* (2013.01); *G01L 5/0052* (2013.01); *G01M 17/02* (2013.01); *G01N 3/34* (2013.01); *G07C 5/0808* (2013.01); *G07C 5/0816* (2013.01); *H04L 67/10* (2013.01); *B60C 2019/004* (2013.01); *B60R 16/0232* (2013.01)

(56) References Cited

U.S. PATENT DOCUMENTS

| | | |
|---|---|---|
| 2013/0131915 A1 | 5/2013 | Masago |
| 2016/0280130 A1* | 9/2016 | Kia ...................... G07C 5/0816 |
| 2017/0253243 A1 | 9/2017 | Dudar et al. |
| 2018/0003593 A1 | 1/2018 | Siegel et al. |
| 2020/0070596 A1 | 3/2020 | Muhlhoff et al. |

FOREIGN PATENT DOCUMENTS

| | | | |
|---|---|---|---|
| EP | 2586629 A1 | 5/2013 | |
| WO | 02068226 A1 | 9/2002 | |
| WO | WO-02068226 A1 * | 9/2002 | ........... B60C 23/061 |

* cited by examiner

TIRE DAMAGE DETECTION SYSTEM AND METHOD

CROSS-REFERENCE TO RELATED APPLICATIONS

This application claims priority from Italian Patent Application No. 102018000005904 filed on May 31, 2018, the disclosure of which is incorporated by reference.

TECHNICAL FIELD OF THE INVENTION

The present invention relates to a system and a method for detecting potential damages to tires of motor vehicles due to impacts against/on obstacles.

STATE OF THE ART

As is known, an impact of a wheel of a motor vehicle against/on an obstacle, such as a sidewalk, a pothole or a speed bump, can cause a damage to the tire of the wheel, in particular to the carcass (i.e., the casing) of the tire.

In particular, an externally visible bulge on the sidewall of a tire typically indicates that cords have been broken inside the carcass due to an impact against/on an obstacle. In fact, driving on objects like curbs, speed bumps and potholes can cause individual cords to break.

If a damaged tire (e.g., a tire with some damaged cords) is not promptly detected and, hence, is not promptly repaired/replaced, by keeping on driving with said damaged tire there is a risk of completely breaking/destroying the carcass of the tire and even of damaging the wheel rim and/or the suspension (for example, in case of further impacts of the damaged tire against/on other obstacles).

Therefore, in the automotive sector there is markedly felt the need for tire damage detection technologies capable of automatically and promptly detecting potential damages to tires of motor vehicles.

For example, a known solution of this kind is provided in DE 10 2016 105 281 A1, which relates to a wheel impact sensing and driver warning system. In particular, DE 10 2016 105 281 A1 discloses a wheel impact sensing system of a vehicle, which wheel impact sensing system includes:
  at least one sensor measuring an acceleration of a vehicle wheel resulting from an impact to the vehicle wheel;
  a processor determining a severity of the impact to the vehicle wheel as function of the acceleration measurement; and
  an output device alerting a driver to potential damage of the vehicle wheel based on the determined impact severity to the vehicle wheel.

Moreover, EP 1 457 388 A1 discloses a method and apparatus for estimating road surface state and tire running state. In particular, according to EP 1 457 388 A1, the frequency of an information signal indicative of the vibration of a wheel detected by an acceleration sensor mounted to a wheel, or the frequency of an information signal indicative of a change in the pressure of a gas in a tire detected by a pressure sensor installed in the tire, is analyzed by frequency analyzing means. The band value of the obtained vibration spectrum or pressure change spectrum is detected, and a vibration level or pressure change level at the detected frequency band is compared with a vibration level table showing the relationship between road friction coefficient and vibration level stored in vibration level storage means, or a pressure change level table showing the relationship between road friction coefficient and pressure change level stored in pressure change level storage means, to estimate a road friction coefficient.

Additionally, EP 2 586 629 A1 discloses a method for determining internal failures, such as separations, of a tire. In particular, according to EP 2 586 629 A1, radial acceleration signals of a tire during vehicular travel are detected by an acceleration sensor attached to the inner surface of the tire at the axial center of the tread. A frequency analysis is performed on the radial acceleration signals to obtain a frequency spectrum. A band value is calculated of a specific frequency band within the range of 100 Hz-400 Hz, which includes the frequency of the second lowest peak of the peaks appearing in the frequency spectrum. Then a check is made to see whether or not the difference between this band value and a predetermined band value of a normal tire exceeds a threshold value. If said threshold value is exceeded, it is determined that an internal failure, such as a separation, is present in the tire.

Finally, DE 10 2016 014960 A1 discloses a device for tire control in a vehicle, wherein said device employs at least one sensor unit integrated in a tire for monitoring a tire condition thereof and at least one output unit arranged in the vehicle for outputting detected data related to the tire condition.

OBJECT AND SUMMARY OF THE INVENTION

Object of the present invention is that of providing a technology for performing tire damage detection in a more efficient and reliable way than currently known tire damage detection technologies.

This and other objects are achieved by the present invention in that it relates to a tire damage detection method, as defined in the appended claims.

In particular, the present invention concerns a tire damage detection method that includes a tire damage detection step comprising:
  providing
    an acquisition device, which is installed on board a motor vehicle equipped with two or more wheels fitted with tires, and which is coupled to a vehicle bus of the motor vehicle, and
    a processing device/system storing a predefined tire damage model;
  acquiring, by the acquisition device from the vehicle bus, signals indicative of speeds of the motor vehicle and of a wheel of said motor vehicle;
  outputting, by the acquisition device, quantities indicative of the speeds of the motor vehicle and of the wheel thereof;
  receiving, by the processing device/system from the acquisition device, the quantities indicative of the speeds of the motor vehicle and of the wheel of said motor vehicle;
  computing, by the processing device/system, based on the quantities indicative of the speeds of the motor vehicle and of the wheel thereof, a normalized wheel speed indicative of a ratio of the wheel speed to the motor vehicle speed; and
  detecting, by the processing device/system, a potential damage to a tire of the wheel of the motor vehicle based on the predefined tire damage model and on the normalized wheel speed.

Moreover, the tire damage detection method according to the present invention includes also a preliminary step comprising:

performing tests involving test tire impacts against/on different obstacles at different motor vehicle speeds;

measuring/acquiring test-related wheel and motor vehicle speeds during the performed tests;

computing test-related normalized wheel speeds based on the test-related wheel and motor vehicle speeds; and determining the predefined tire damage model to be used by the processing device/system in the tire damage detection step on the basis of the test-related normalized wheel speeds and the test-related motor vehicle speeds that correspond to the test tire impacts.

BRIEF DESCRIPTION OF THE DRAWINGS

For a better understanding of the present invention, preferred embodiments, which are intended purely by way of non-limiting examples, will now be described with reference to the attached drawings (all not to scale), where.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed. Thence, the present invention is not intended to be limited to the embodiments shown and described, but is to be accorded the widest scope of protection consistent with the principles and features disclosed herein and defined in the appended claims.

Figure 1:
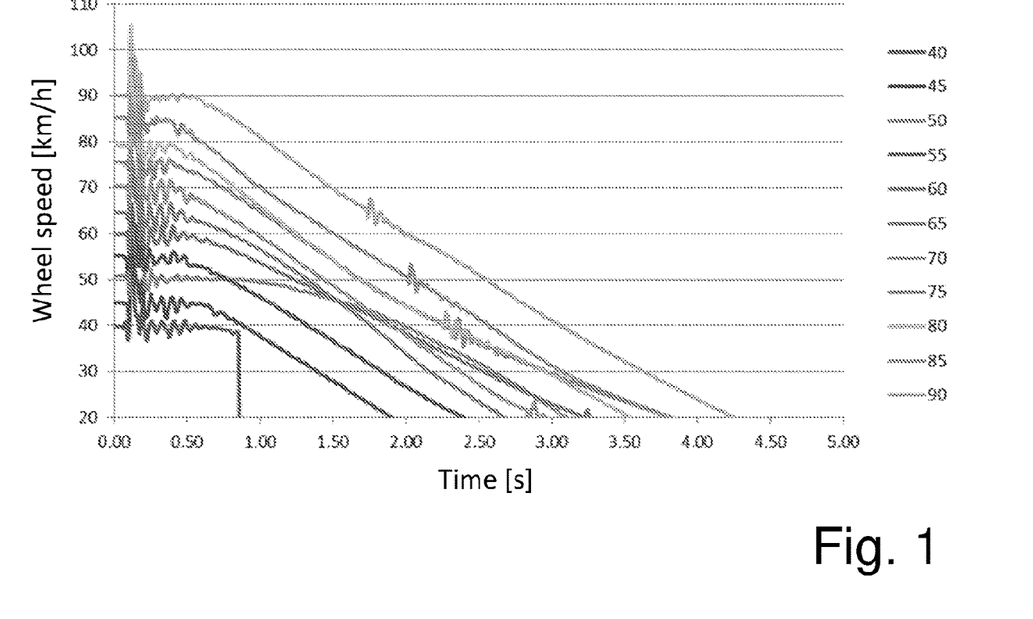
FIG. 1 shows examples of wheel speeds in case of impacts against/on obstacles, such as sidewalks and speed bumps, at different motor vehicle speeds.

The Applicant has carried out an in-depth study in order to conceive and develop an innovative tire damage detection technology with improved efficiency and reliability with respect to the existing solutions. During this in-depth study the Applicant has performed several tests with different obstacles (e.g., sidewalks, speed bumps and potholes) at different motor vehicle speeds (e.g., from 40 km/h up to 90 km/h), wherein, for each test, motor vehicle speeds and wheel speeds have been acquired/measured. In this respect, FIG. 1 shows examples of wheel speeds acquired/measured during the performed tests in case of impacts against/on obstacles, such as sidewalks and speed bumps, at different motor vehicle speeds.

Figure 2:
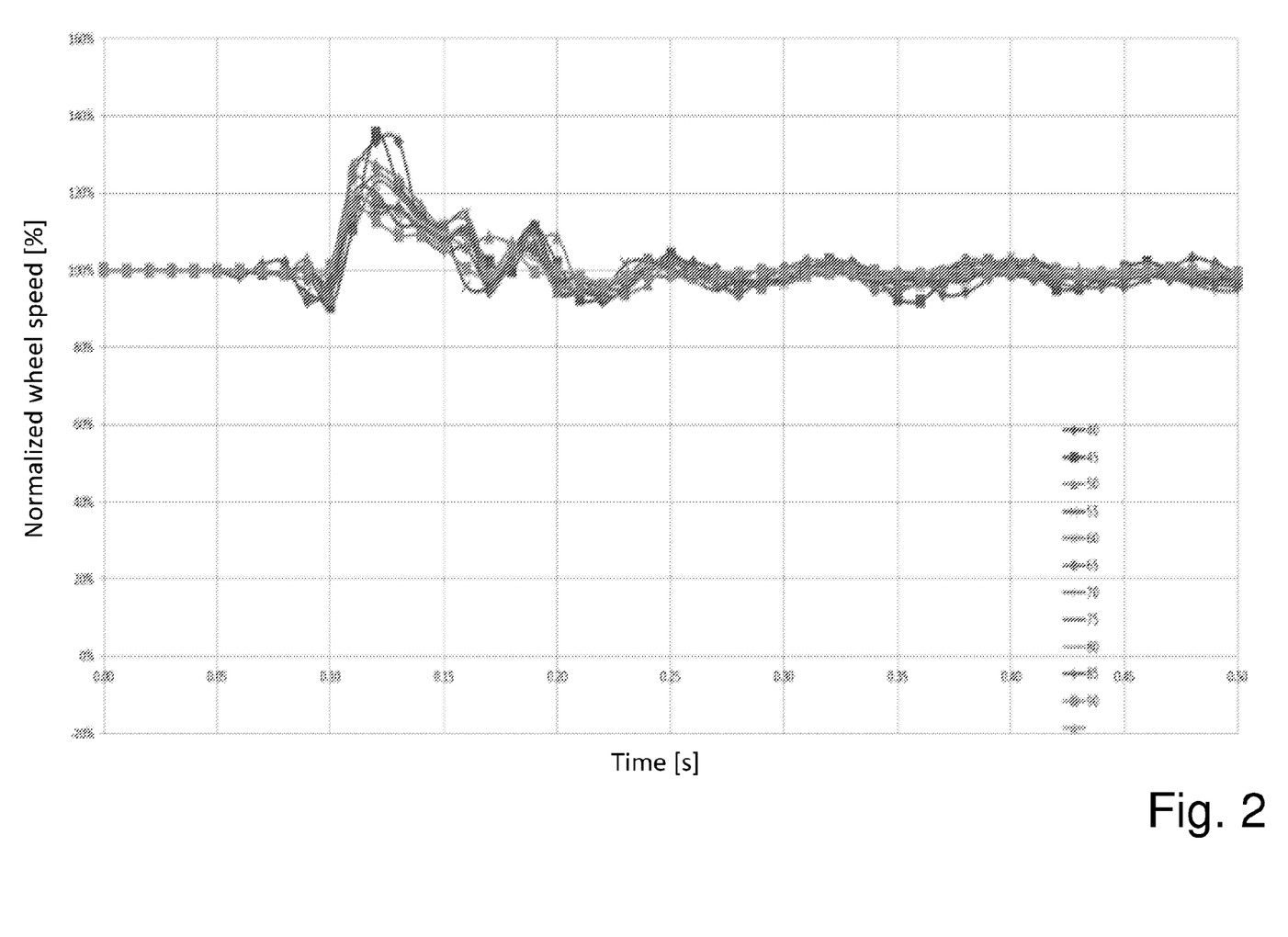
FIG. 2 shows examples of normalized wheel speeds in case of impacts against/on obstacles, such as sidewalks and speed bumps, at different motor vehicle speeds.

Each acquired/measured wheel speed has been normalized with respect to the corresponding motor vehicle speed, so as to obtain a percentage ratio of the wheel speed to the corresponding motor vehicle speed. In this respect, FIG. 2 shows examples of normalized wheel speeds computed during the performed tests in case of impacts against/on obstacles, such as sidewalks and speed bumps, at different motor vehicle speeds. As shown in FIG. 2, in case of impact against/on a sidewalk or a speed bump, the normalized wheel speed assumes a local minimum value and then a local maximum value. Moreover, from other tests performed with obstacles different from sidewalks and speed bumps, such as potholes, the Applicant has observed an "opposite" behavior of the normalized wheel speed, namely the presence, at first, of a local maximum value and, then, of a local minimum value.

Therefore, from the results of the performed tests, the Applicant has inferred that the presence of two successive opposite peaks of the normalized wheel speed is indicative of an impact of the wheel against/on an obstacle. Additionally, the Applicant has also noticed that the time distance between two successive opposite peaks of the normalized wheel speed, which are indicative of an impact of the wheel against/on an obstacle, decreases as the motor vehicle speed increases.

Figure 3:
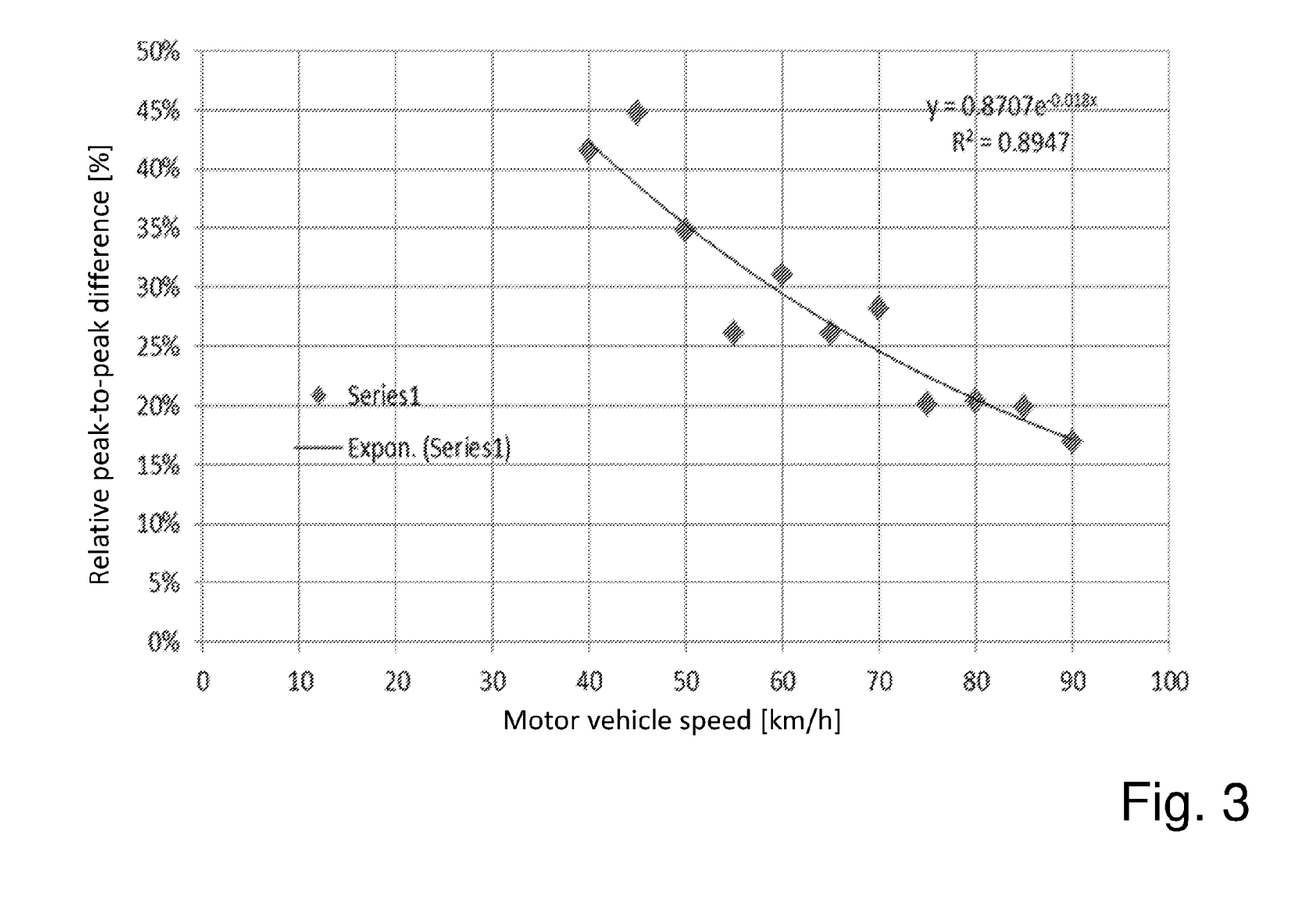
FIG. 3 shows examples of relative peak-to-peak differences in the normalized wheel speed as a function of motor vehicle speed.

Thence, the Applicant has had the smart idea of exploiting these characteristics to detect damages to tires. In this connection, FIG. 3 shows examples of relative peak-to-peak differences in the normalized wheel speed as a function of the motor vehicle speed. The graph in FIG. 3 substantially presents a negative exponential trend of the type $y=Ce^{-\alpha x}$.

Therefore, starting from the above observations, deductions and intuitions, the Applicant has conceived a tire damage detection method including a preliminary step and a tire damage detection step, wherein the preliminary step comprises:

performing tests involving test tire impacts against/on different obstacles at different motor vehicle speeds; and determining, based on results of the performed tests, one or more predefined tire damage models to be used in the tire damage detection step to detect potential damages to one or more tires of a motor vehicle.

In particular, starting from the above general methodology, the Applicant has conceived three preferred implementations of the tire damage detection step that will be described in detail hereinafter.

Figure 4:
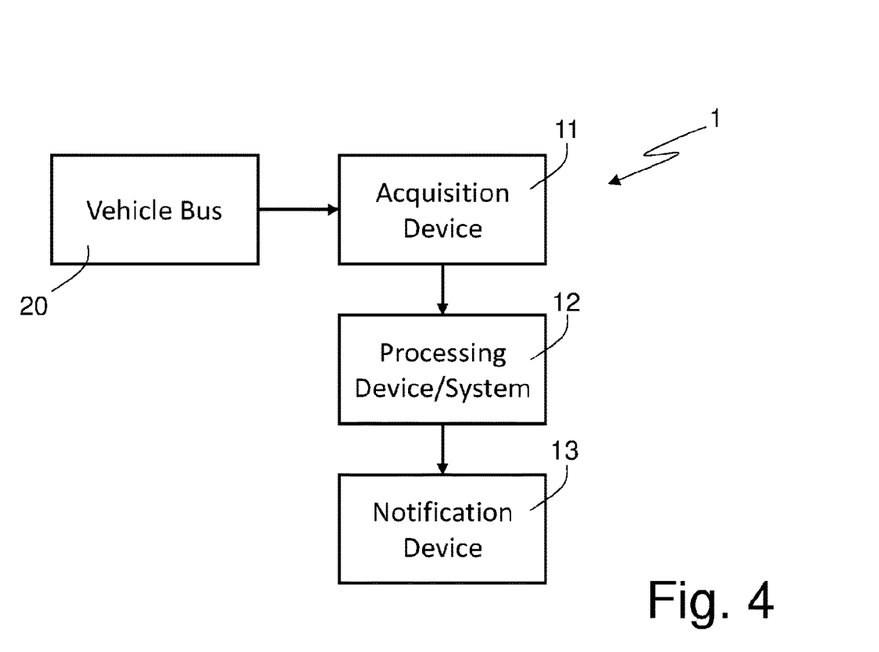
FIG. 4 schematically illustrates a tire damage detection system according to a preferred embodiment of the present invention.

To this end, FIG. 4 schematically illustrates (in particular, by means of a block diagram) a functional architecture of a tire damage detection system (denoted as a whole by 1) according to a preferred embodiment of the present invention.

In particular, the tire damage detection system 1 includes:

an acquisition device 11, which is installed on board a motor vehicle (not shown in FIG. 4—e.g., a scooter, a motorbike, a car, a van, a truck, etc.) equipped with two or more wheels, each fitted with a tire, and coupled to a vehicle bus 20 (e.g., based on Controller Area Network (CAN) bus standard) of said motor vehicle; and a processing device/system 12, which is connected, in a wired or wireless fashion, to the acquisition device 11, and configured to store a predefined tire damage model (that, as previously explained, has been determined in the preliminary step).

According to a first preferred implementation of the tire damage detection step, the acquisition device 11 is configured to acquire, from the vehicle bus 20, signals indicative of speeds of the motor vehicle and of a wheel of said motor vehicle (conveniently, speed signals expressed in kilometres or miles per hour), and output quantities indicative of the speeds of the motor vehicle and of the wheel thereof; and the processing device/system 12 is configured to receive, from the acquisition device 11, the quantities indicative of the speeds of the motor vehicle and of the wheel of said motor vehicle, and is programmed to compute, based on the quantities indicative of the speeds of the motor vehicle and of the wheel thereof, a first normalized wheel speed indicative of a ratio (preferably, a percentage ratio) of the wheel speed to the motor vehicle speed, and detect a potential damage to a tire of the wheel of the motor vehicle (e.g., a potential damage to carcass/cords of the tire) based on the predefined tire damage model and on the first normalized wheel speed.

For example, the following mathematical formula may be conveniently used to compute the first normalized wheel speed at a generic time instant $t_k$:

$$v_{N1}(t_k)=(v_w(t_k)*100)/v_v(t_k),$$

where $v_{N1}(t_k)$, $v_w(t_k)$ and $v_v(t_k)$ denote, respectively, the first normalized wheel speed, the wheel speed and the motor vehicle speed at said generic time instant $t_k$.

Preferably, the predefined tire damage model includes a set of first predefined thresholds related to different motor vehicle speed values and a set of first predefined time lengths related to different motor vehicle speed values (wherein said first predefined thresholds and said first predefined time lengths are conveniently determined in the preliminary step). Moreover, the processing device/system 12 is preferably programmed to:

select one of the first predefined thresholds and one of the first predefined time lengths depending on the motor vehicle speed;

analyse the first normalized wheel speed by means of a first sliding time window having the first predefined time length selected;

detect a maximum value and a minimum value of the first normalized wheel speed within the first sliding time window; and detect a potential damage to the tire of the wheel of the motor vehicle if a difference between said maximum and minimum values exceeds the first predefined threshold selected.

In other words, the actual first predefined threshold and the actual first predefined time length used by the processing device/system 12 for, respectively, the tire damage detection and the first sliding time window are selected, by said processing device/system 12, depending on the actual motor vehicle speed value.

Moreover, the tire damage detection may be conveniently based also on tire inflation pressure (in fact, the risk of damage to a tire increases as the tire inflation pressure decreases). In this case, the acquisition device 11 is conveniently configured to:

acquire, from the vehicle bus 20, also a signal indicative of a tire inflation pressure of the tire of the wheel of the motor vehicle; and output quantities indicative of said tire inflation pressure.

Additionally, the first predefined thresholds are conveniently related to different motor vehicle speed values and different tire inflation pressure values, and the processing device/system 12 is conveniently configured to receive, from the acquisition device 11, also the quantities indicative of the tire inflation pressure, and is conveniently programmed to select one of the first predefined thresholds depending on the motor vehicle speed and the tire inflation pressure.

In other words, the actual first predefined threshold used by the processing device/system 12 for the tire damage detection is selected, by said processing device/system 12, depending on the actual motor vehicle speed value and the actual tire inflation pressure value.

Instead, according to a second preferred implementation of the tire damage detection step, the acquisition device 11 is configured to acquire, from the vehicle bus 20, a signal indicative of a speed of a wheel of the motor vehicle (conveniently, a wheel speed signal expressed in kilometres or miles per hour), and output quantities indicative of the wheel speed; and the processing device/system 12 is configured to receive, from the acquisition device 11, the quantities indicative of the wheel speed, and is programmed to compute, based on the quantities indicative of the wheel speed, a second normalized wheel speed indicative of a ratio (preferably, a percentage ratio) of the wheel speed to an average wheel speed indicative of the motor vehicle speed, and detect a potential damage to a tire of the wheel of the motor vehicle based on the predefined tire damage model and on the second normalized wheel speed.

For example, the following mathematical formula may be conveniently used to compute the second normalized wheel speed at a generic time instant $t_k$:

$$v_{N2}(t_k)=(v_w(t_k)*100)/v_A(t_k),$$

where $v_{N2}(t_k)$ and $v_w(t_k)$ denote, respectively, the second normalized wheel speed and the wheel speed at the generic time instant $t_k$, while $v_A(t_k)$ denotes an average wheel speed associated with said generic time instant $t_k$. Conveniently, the average wheel speed $v_A(t_k)$ may be computed as an average of a plurality of wheel speed values at time instants that may precede and/or follow the generic time instant $t_k$, wherein said plurality of wheel speed values may also comprise the wheel speed value at the generic time instant $t_k$.

Preferably, the predefined tire damage model includes a set of second predefined thresholds related to different average wheel speed values and a set of second predefined time lengths related to different average wheel speed values (wherein said second predefined thresholds and said second predefined time lengths are conveniently determined in the preliminary step). Moreover, the processing device/system 12 is preferably programmed to:

select one of the second predefined thresholds and one of the second predefined time lengths depending on the average wheel speed;

analyse the second normalized wheel speed by means of a second sliding time window having the second predefined time length selected;

detect a maximum value and a minimum value of the second normalized wheel speed within the second sliding time window; and detect a potential damage to the tire of the wheel of the motor vehicle if a difference between said maximum and minimum values exceeds the second predefined threshold selected.

Moreover, also according to the second preferred implementation of the tire damage detection step, the tire damage detection may be conveniently based also on tire inflation pressure. In this case, the acquisition device 11 is conveniently configured to:
  acquire, from the vehicle bus 20, also a signal indicative of a tire inflation pressure of the tire of the wheel of the motor vehicle; and
  output quantities indicative of said tire inflation pressure.

Additionally, the second predefined thresholds are conveniently related to different average wheel speed values and different tire inflation pressure values, and the processing device/system 12 is conveniently configured to receive, from the acquisition device 11, also the quantities indicative of the tire inflation pressure, and is conveniently programmed to select one of the second predefined thresholds depending on the average wheel speed and the tire inflation pressure.

Instead, according to a third preferred implementation of the tire damage detection step,
  the acquisition device 11 is configured to
    acquire, from the vehicle bus 20, a signal indicative of a speed of a wheel of the motor vehicle (conveniently, a wheel speed signal expressed in kilometres or miles per hour), and
    output quantities indicative of the wheel speed;
  the predefined tire damage model includes a set of third predefined thresholds related to different reference wheel speed values and a set of third predefined time lengths related to different reference wheel speed values (wherein said third predefined thresholds and said third predefined time lengths are conveniently determined in the preliminary step); and
  the processing device/system 12 is configured to receive, from the acquisition device 11, the quantities indicative of the wheel speed, and is programmed to
    analyse the wheel speed by means of a third sliding time window,
    select one of the third predefined thresholds and one of the third predefined time lengths based on a given reference wheel speed value that is a wheel speed value, or an average of wheel speed values, immediately preceding and/or following the third sliding time window (said given reference wheel speed value being assumed to be indicative of the motor vehicle speed), wherein said third sliding time window has the third predefined time length selected,
    detect a maximum value and a minimum value of the wheel speed within the third sliding time window,
    compute a difference between said maximum and minimum values,
    compute a ratio of the difference between said maximum and minimum values to the given reference wheel speed value, and
    detect a potential damage to the tire of the wheel of the motor vehicle if the ratio of the difference between said maximum and minimum values to the given reference wheel speed value exceeds the third predefined threshold selected.

Moreover, also according to the third preferred implementation of the tire damage detection step, the tire damage detection may be conveniently based also on tire inflation pressure. In this case, the acquisition device 11 is conveniently configured to:
  acquire, from the vehicle bus 20, also a signal indicative of a tire inflation pressure of the tire of the wheel of the motor vehicle; and
  output quantities indicative of said tire inflation pressure.

Additionally, the third predefined thresholds are conveniently related to different reference wheel speed values and different tire inflation pressure values, and the processing device/system 12 is conveniently configured to receive, from the acquisition device 11, also the quantities indicative of the tire inflation pressure, and is conveniently programmed to select one of the third predefined thresholds depending on the given reference wheel speed value and the tire inflation pressure.

According to the first, second and third preferred implementations of the tire damage detection step, the acquisition device 11 may be conveniently configured to produce the quantities indicative of the wheel speed by sampling the signal indicative of said speed acquired from the vehicle bus 20 with a sampling frequency equal to or higher than 50 Hz, preferably equal to or higher than 100 Hz.

Moreover, according to the first preferred implementation of the tire damage detection step, the acquisition device 11 may be conveniently configured to produce the quantities indicative of the motor vehicle speed by sampling the signal indicative of said speed acquired from the vehicle bus 20 with the same sampling frequency as the one used for the wheel speed, or with a lower sampling frequency (e.g., 5 or 10 Hz).

Again with reference to FIG. 4, the tire damage detection system 1 further includes a notification device 13 configured to, if a potential damage to the tire of the wheel of the motor vehicle is detected by the processing device/system 12, inform a user associated with said motor vehicle (e.g., a driver and/or an owner thereof) of the potential damage detected.

From the foregoing, it is immediately clear to those skilled in the art that the tire damage detection system 1 may be conveniently configured to perform the tire damage detection for each wheel of the motor vehicle. In fact, to this end:
  the acquisition device 11 may be conveniently configured to acquire signals and, then, output quantities indicative of the speed of each wheel of the motor vehicle;
  the processing device/system 12 may be conveniently programmed to apply the aforesaid detection operations to the speed of each wheel of the motor vehicle; and
  the notification device 13 may be conveniently configured to, in case of detected potential damage to a tire of a wheel of the motor vehicle, signal to the user which tire is damaged.

Conveniently, the processing device/system 12 may store:
  a single predefined tire damage model to be used for all the wheels of the motor vehicle; or
  different predefined tire damage models, such as a respective predefined tire damage model for each wheel, or two different predefined tire damage models, one to be used for the front wheels and the other for the rear ones.

Figure 5:
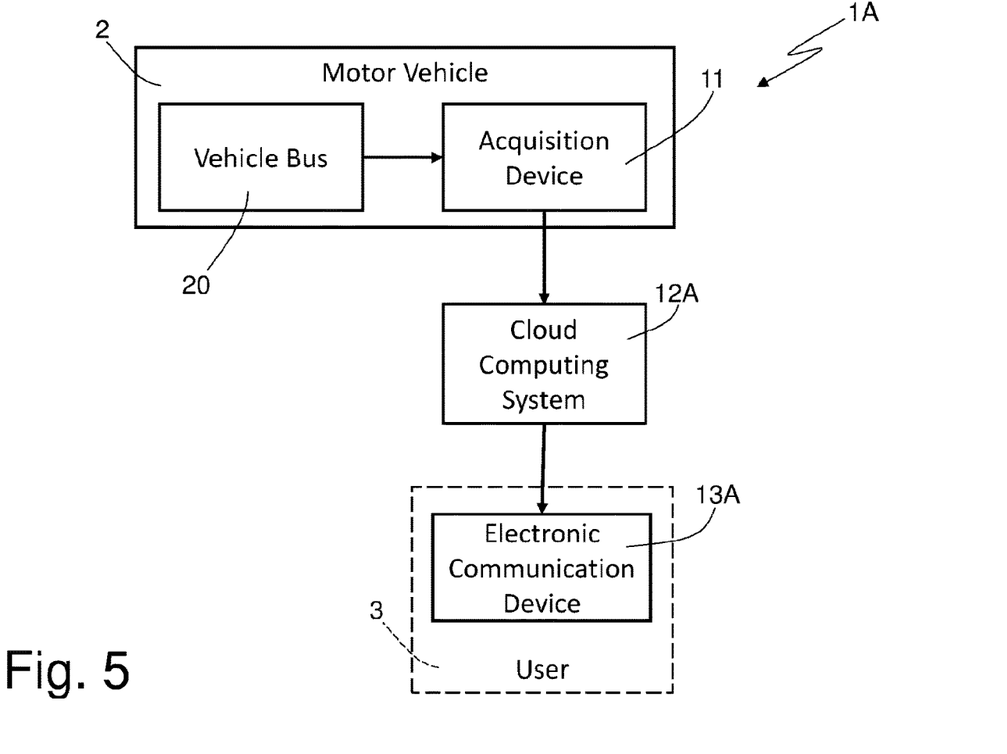
FIGS. 5 and 6 schematically illustrate two specific preferred embodiments of the tire damage detection system of FIG. 4.
Figure 6:
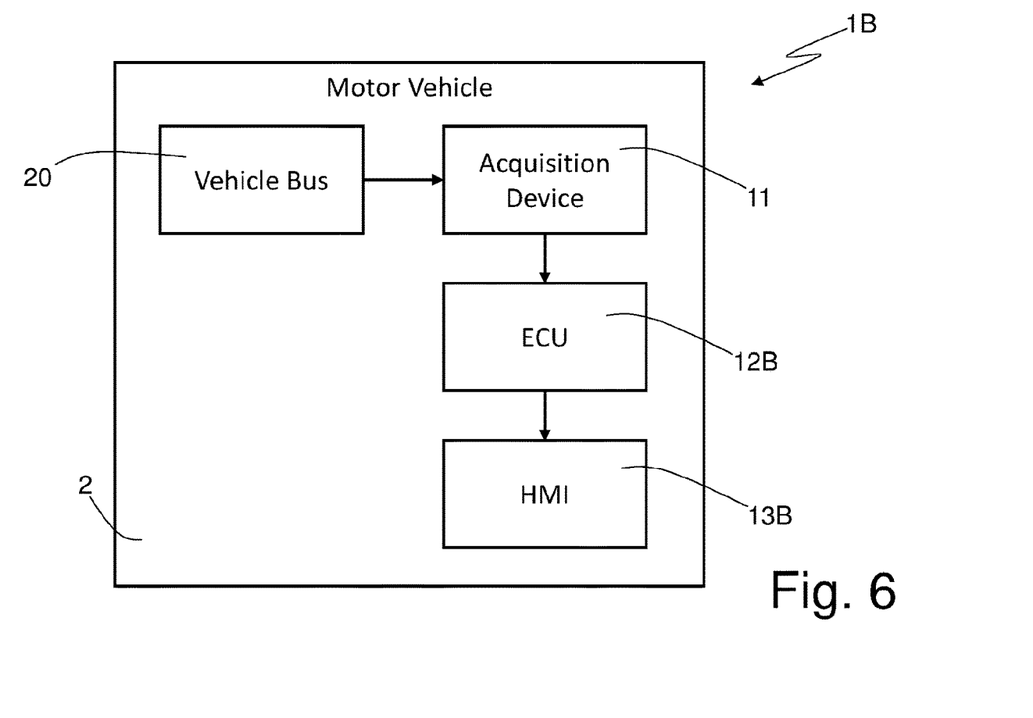

FIGS. 5 and 6 schematically illustrate two specific preferred embodiments of the tire damage detection system 1.

In particular, with reference to FIG. 5, in a first specific preferred embodiment (denoted as a whole by 1A) of the tire damage detection system 1:
  the processing device/system 12 is implemented/carried out by means of a cloud computing system 12A that is wirelessly and remotely connected to the acquisition device 11 (e.g., via one or more mobile communications technologies, such as GSM, GPRS, EDGE, HSPA, UMTS, LTE, LTE Advanced and/or future 5th generation (or even beyond) wireless communications systems); and the notification device 13 is implemented/carried out by means of an electronic communication device 13A (such as a smartphone, a tablet, a laptop, a desktop computer, a smart TV, a smartwatch, etc.), which is associated with (e.g., owned and/or used by) the user (in FIG. 5 denoted by 3) associated with the motor vehicle (in FIG. 5 denoted by 2), and which is remotely connected to the cloud computing system 12A via one or more wired and/or wireless networks.

Preferably, the cloud computing system 12A is programmed to, if it detects a potential damage to a tire of a wheel of the motor vehicle 2, send a damage notification to the electronic communication device 13A that provides the user 3 with said damage notification. For example, the notification device 13 may conveniently be a smartphone or tablet on which a software application (i.e., a so-called app) is installed, which app is configured to receive, from the cloud computing system 12A, a push notification indicating a detected potential damage. Other types of damage notification may be also used, such as SMS messages, email messages or, more in general, messages of text and/or audio and/or image and/or video and/or multimedia type(s).

It is worth noting that the cloud computing system 12A may be advantageously used to provide many motor vehicles 2 and, hence, many users 3 with a tire damage detection service.

Instead, with reference to FIG. 6, in a second specific preferred embodiment (denoted as a whole by 1B) of the tire damage detection system 1:
- the processing device/system 12 is implemented/carried out by means of an (automotive) Electronic Control Unit (ECU) 12B installed on board the motor vehicle 2; and
- the notification device 13 is implemented/carried out by means of a Human-Machine Interface (HMI) 13B provided on board the motor vehicle 2.

In said second specific preferred embodiment 1B, the ECU 12B may conveniently inform a driver of the motor vehicle 2 of a detected potential damage to a tire of a wheel of said motor vehicle 2 via a graphical and/or sound alert produced by the HMI 13B (which, thence, may conveniently comprise a screen and/or a graphical/sound warning indicator).

The ECU 12B may conveniently be an ECU specifically dedicated to the tire damage detection, or an ECU dedicated to several tasks including also the tire damage detection.

Similarly, the HMI 13B may conveniently be a HMI specifically dedicated to the tire damage detection, or a HMI dedicated to several tasks including also the tire damage detection (e.g., a HMI of an onboard infotelematics and/or driver assistance system).

Again with reference to the tire damage detection method according to the present invention, the tire damage detection step comprises operating the tire damage detection system 1 to detect potential damages to one or more tires of the motor vehicle 2. Moreover, also the preliminary step may be carried out according to three preferred implementations corresponding to the three preferred implementations of the tire damage detection step.

In particular, according to a first preferred implementation of the preliminary step, said preliminary step comprises:
- performing tests involving test tire impacts against/on different obstacles at different motor vehicle speeds;
- measuring/acquiring test-related wheel and motor vehicle speeds during the performed tests;
- computing test-related normalized wheel speeds based on the test-related wheel and motor vehicle speeds; and
- determining the predefined tire damage model(s) (conveniently, the first predefined thresholds and time lengths) to be used by the tire damage detection system 1 in the tire damage detection step on the basis of the test-related normalized wheel speeds and the test-related motor vehicle speeds that correspond to the test tire impacts.

Instead, according to a second preferred implementation of the preliminary step, said preliminary step comprises:
- performing tests involving test tire impacts against/on different obstacles at different motor vehicle speeds;
- measuring/acquiring test-related wheel speeds during the performed tests;
- computing test-related normalized wheel speeds based on the test-related wheel speeds; and
- determining the predefined tire damage model(s) (conveniently, the second predefined thresholds and time lengths) to be used by the tire damage detection system 1 in the tire damage detection step on the basis of the test-related normalized wheel speeds corresponding to the test tire impacts and of associated test-related average wheel speeds.

Finally, according to a third preferred implementation of the preliminary step, said preliminary step comprises:
- performing tests involving test tire impacts against/on different obstacles at different motor vehicle speeds;
- measuring/acquiring test-related wheel speeds during the performed tests; and
- determining the predefined tire damage model(s) (conveniently, the third predefined thresholds and time lengths) to be used by the tire damage detection system 1 in the tire damage detection step on the basis of the test-related wheel speeds corresponding to the test tire impacts and of associated test-related reference wheel speed values.

Conveniently, according to the first, second and third preferred implementations of the preliminary step, said preliminary step may further comprise:
- measuring/acquiring also test-related tire inflation pressures during the performed tests; and
- determining the predefined tire damage model(s) (conveniently, the first/second/third predefined thresholds) based also on the test-related tire inflation pressures measured/acquired during the performed tests.

In view of the foregoing, it is clear that the tire damage detection system and method according to the present invention allow performing a real-time, extremely efficient and highly reliable tire damage detection. In this respect, it is worth noting that the present invention allows also tuning tire damage detection reliability according to a desired reliability degree. In fact, many different reliability levels can be chosen and, hence, implemented for the tire damage detection. For example, in the simplest case, a single tire damage model could be determined in the preliminary step and then used in the tire damage detection step for all tire models and all motor vehicles. Instead, in order to increase tire damage detection reliability, a respective tire damage model may be determined in the preliminary step for each tire model (thereby taking account of specific tire features, such as specific tire dimensions) and then used in the tire damage detection step for motor vehicles fitted with said tire model. Moreover, in order to further increase tire damage detection reliability, even different tire damage models can be determined for each tire model (e.g., to take account of different positions, such as front/rear and/or right/left) and then selectively used in the tire damage detection step for motor vehicles fitted with said tire model. Additionally, further reliability improvements might be obtained by taking account also of specific features of different motor vehicles and/or of geometrical features of different obstacles.

Moreover, it is worth also noting that the tire damage model(s) may be advantageously updated in the tire damage detection step based on false positive errors and false negative errors (i.e., detected potential damages that do not correspond to actual damages to tires, and actual damages to tires that are not detected), thereby improving tire damage detection reliability. For example, in case of an actual damage to a tire that has not been detected, the driver could take a picture of the damaged tire by means of his/her smartphone/tablet and then send the picture to a server dedicated to receiving user feedbacks.

From the foregoing, the technical advantages and the innovative features of the present invention are immediately clear to those skilled in the art.

In particular, it is important to stress the point that the present invention allows performing a real-time, extremely efficient and highly reliable tire damage detection. More specifically, the present invention allows carrying out tire damage detection in a more efficient and reliable way than currently known tire damage detection technologies.

Additionally, the present invention allows tuning tire damage detection reliability according to a desired reliability degree.

In conclusion, it is clear that numerous modifications and variants can be made to the present invention, all falling within the scope of the invention, as defined in the appended claims.

The invention claimed is:

1. A tire damage detection method comprising:
a tire damage detection stage comprising
    acquiring, by an acquisition device which is installed on board a motor vehicle equipped with two or more wheels fitted with tires, and which is coupled to a vehicle bus of the motor vehicle, signals indicative of speeds of the motor vehicle and of a wheel of said motor vehicle,
    outputting, by the acquisition device, quantities indicative of the speeds of the motor vehicle and of the wheel thereof,
    receiving, by a processing system storing a predefined tire damage model from the acquisition device, the quantities indicative of the speeds of the motor vehicle and of the wheel of said motor vehicle,
    computing, by the processing system, based on the quantities indicative of the speeds of the motor vehicle and of the wheel of said motor vehicle, a normalized wheel speed indicative of a ratio of the wheel speed to the motor vehicle speed, and
    detecting, by the processing system, a potential damage to a tire of the wheel of the motor vehicle based on the predefined tire damage model and on the normalized wheel speed; and
a preliminary stage that comprises:
    performing tests involving test tire impacts against/on different obstacles at different motor vehicle speeds,
    acquiring test-related wheel and motor vehicle speeds during the performed tests,
    computing test-related normalized wheel speeds based on the test-related wheel and motor vehicle speeds, and
    determining the predefined tire damage model to be used by the processing system in the tire damage detection stage based on the test-related normalized wheel speeds and the test-related motor vehicle speeds that correspond to the test tire imp acts.

2. The tire damage detection method of claim 1, wherein:
the predefined tire damage model includes a set of predefined thresholds related to different motor vehicle speed values and a set of predefined time lengths related to different motor vehicle speed values; and
detecting, by the processing system, a potential damage to a tire of the wheel of the motor vehicle includes:
    selecting one of the predefined thresholds and one of the predefined time lengths depending on the motor vehicle speed,
    analyzing the normalized wheel speed by means of a sliding time window having the predefined time length selected,
    detecting a maximum value and a minimum value of the normalized wheel speed within the sliding time window, and
    detecting a potential damage to the tire of the wheel of the motor vehicle if a difference between said maximum and minimum values exceeds the predefined threshold selected.

3. The tire damage detection method of claim 2, wherein:
the predefined thresholds are related to different motor vehicle speed values and different tire inflation pressure values, and
in the tire damage detection stage:
    further acquiring a signal indicative of a tire inflation pressure of the tire of the wheel of the motor vehicle;
    further outputting quantities indicative of said tire inflation pressure;
    further receiving the quantities indicative of the tire inflation pressure; and
    selecting one of the predefined thresholds depending on the motor vehicle speed and the tire inflation pressure.

4. A tire damage detection system comprising:
an acquisition device installed onboard a motor vehicle equipped with two or more wheels fitted with tires, and coupled to a vehicle bus of the motor vehicle;
wherein the acquisition device is configured to acquire signals indicative of speeds of the motor vehicle and of a wheel of said motor vehicle and to output quantities indicative of the speeds of the motor vehicle and of the wheel thereof;
a processing system storing a predefined tire damage model, and further configured to perform tire damage detection by
    receiving the quantities indicative of the speeds of the motor vehicle and of the wheel of said motor vehicle,
    computing, based on the quantities indicative of the speeds of the motor vehicle and of the wheel of said motor vehicle, a normalized wheel speed indicative of a ratio of the wheel speed to the motor vehicle speed, and
    detecting a potential damage to a tire of the wheel of the motor vehicle based on the predefined tire damage model and on the normalized wheel speed.

5. The tire damage detection system of claim 4, wherein the processing system is further configured to carry out preliminary operations comprising:
    performing tests involving test tire impacts against/on different obstacles at different motor vehicle speeds;
    acquiring test-related wheel and motor vehicle speeds during the performed tests;
    computing test-related normalized wheel speeds based on the test-related wheel and motor vehicle speeds; and determining the predefined tire damage model to be used by the processing system for tire damage detection based on the test-related normalized wheel speeds and the test-related motor vehicle speeds that correspond to the test tire impacts.

6. The tire damage detection system of claim 4, wherein:
the predefined tire damage model includes a set of predefined thresholds related to different motor vehicle speed values and a set of predefined time lengths related to different motor vehicle speed values; and
the processing system is configured to detect the potential damage to a tire of the wheel of the motor vehicle by:
selecting one of the predefined thresholds and one of the predefined time lengths depending on the motor vehicle speed;
analyzing the normalized wheel speed by means of a sliding time window having the predefined time length selected;
detecting a maximum value and a minimum value of the normalized wheel speed within the sliding time window; and
detecting a potential damage to the tire of the wheel of the motor vehicle if a difference between said maximum and minimum values exceeds the predefined threshold selected.

7. The tire damage detection system of claim 6, wherein:
the predefined thresholds are related to different motor vehicle speed values and different tire inflation pressure values, and
the processing system is further configured to perform tire damage detection by:
further acquiring a signal indicative of a tire inflation pressure of the tire of the wheel of the motor vehicle;
further outputting quantities indicative of said tire inflation pressure;
further receiving the quantities indicative of the tire inflation pressure; and
selecting one of the predefined thresholds depending on the motor vehicle speed and the tire inflation pressure.

8. The tire damage detection system of claim 4, further comprising a notification device configured to, if a potential damage to the tire of the wheel of the motor vehicle is detected by the processing system, signal the detected potential damage to a user associated with the motor vehicle.

9. The tire damage detection system of claim 8, wherein the processing system is an electronic control unit installed onboard the motor vehicle.

10. The tire damage detection system of claim 9, wherein the notification device is a human-machine interface provided onboard the motor vehicle.

11. A cloud computing system that is wirelessly and remotely connected to an acquisition device installed onboard a motor vehicle equipped with two or more wheels fitted with tires, and coupled to a vehicle bus of the motor vehicle;
wherein the cloud computing system stores a predefined tire damage model and is configured, in a tire damage detection stage, to:
receive from the acquisition device quantities indicative of the speeds of the motor vehicle and of the wheel of said motor vehicle;
compute, based on the quantities indicative of the speeds of the motor vehicle and of the wheel of said motor vehicle, a normalized wheel speed indicative of a ratio of the wheel speed to the motor vehicle speed; and
detect a potential damage to a tire of the wheel of the motor vehicle based on the predefined tire damage model and on the normalized wheel speed.

12. The cloud computing system of claim 11, wherein the cloud computing system is further configured, in a preliminary state, to:
perform tests involving test tire impacts against/on different obstacles at different motor vehicle speeds;
acquire test-related wheel and motor vehicle speeds during the performed tests;
compute test-related normalized wheel speeds based on the test-related wheel and motor vehicle speeds; and
determine the predefined tire damage model to be used for the tire damage detection stage based on the test-related normalized wheel speeds and the test-related motor vehicle speeds that correspond to the test tire impacts.

13. The cloud computing system of claim 11, further remotely connected to an electronic communication device associated with a user associated with the motor vehicle, wherein the cloud computing system is further configured to, if a potential damage to the tire of the wheel of the motor vehicle is detected, signal the detected potential damage to the user via the electronic communication device.

14. The cloud computing system of claim 11, wherein:
the predefined tire damage model includes a set of predefined thresholds related to different motor vehicle speed values and a set of predefined time lengths related to different motor vehicle speed values; and
the cloud computing system is configured to detect the potential damage to a tire of the wheel of the motor vehicle by:
selecting one of the predefined thresholds and one of the predefined time lengths depending on the motor vehicle speed;
analyzing the normalized wheel speed by means of a sliding time window having the predefined time length selected;
detecting a maximum value and a minimum value of the normalized wheel speed within the sliding time window; and
detecting a potential damage to the tire of the wheel of the motor vehicle if a difference between said maximum and minimum values exceeds the predefined threshold selected.

15. The cloud computing system of claim 14, wherein:
the predefined thresholds are related to different motor vehicle speed values and different tire inflation pressure values, and
the cloud computing system is further configured to perform tire damage detection by:
further acquiring a signal indicative of a tire inflation pressure of the tire of the wheel of the motor vehicle;
further outputting quantities indicative of said tire inflation pressure;
further receiving the quantities indicative of the tire inflation pressure; and
selecting one of the predefined thresholds depending on the motor vehicle speed and the tire inflation pressure.

\* \* \* \* \*